(12) United States Patent
Bukhamsin et al.

(10) Patent No.: US 12,271,414 B2
(45) Date of Patent: Apr. 8, 2025

(54) METHOD AND SYSTEM FOR INTELLIGENT MAINTENANCE SERVICES USING MACHINE LEARNING

(71) Applicant: SAUDI ARABIAN OIL COMPANY, Dhahran (SA)

(72) Inventors: Abdullah Yousef Bukhamsin, Al Mubarraz (SA); Nadim Sohail, Rosny-Sous-Bois (FR); Dalal Abadi Alharbi, Dhahran (SA); Yaqeen Abdullah Al Mahdi, Safwa (SA); Serkan Dursun, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 372 days.

(21) Appl. No.: 17/804,038

(22) Filed: May 25, 2022

(65) Prior Publication Data

US 2023/0385324 A1  Nov. 30, 2023

(51) Int. Cl.
*G06F 16/35* (2019.01)
*G06F 16/353* (2025.01)
*G06F 16/383* (2019.01)

(52) U.S. Cl.
CPC .......... *G06F 16/353* (2019.01); *G06F 16/383* (2019.01)

(58) Field of Classification Search
CPC ... G06F 16/353; G06F 16/383; G06Q 10/103; G06Q 10/20
See application file for complete search history.

(56) References Cited

U.S. PATENT DOCUMENTS

| | | | |
|---|---|---|---|
| 10,691,732 B1 | 6/2020 | Zhang | |
| 10,754,883 B1 | 8/2020 | Kannu et al. | |
| 2017/0068721 A1* | 3/2017 | Chafle | G06F 11/079 |
| 2018/0032874 A1* | 2/2018 | Sánchez Charles | G06N 7/01 |
| 2020/0257969 A1 | 8/2020 | Goloubew et al. | |
| 2021/0027167 A1 | 1/2021 | Goloubew et al. | |
| 2021/0328888 A1* | 10/2021 | Rath | H04L 41/5074 |
| 2022/0026895 A1* | 1/2022 | Leitch | G06N 20/00 |

FOREIGN PATENT DOCUMENTS

CN  107609132 B  3/2020

OTHER PUBLICATIONS

Bruce Stephen, Extracting Distribution Network Fault Semantic Labels From Free Text Incident Tickets, 2020, IEEE Transactions on Power Delivery, vol. 35, p. 1610-1612 (Year: 2020).*

* cited by examiner

*Primary Examiner* — Pierre M Vital
*Assistant Examiner* — Andrew N Ho
(74) *Attorney, Agent, or Firm* — Osha Bergman Watanabe & Burton LLP

(57) ABSTRACT

A method for intelligent maintenance services using machine learning involves obtaining maintenance tickets associated with an industrial operation. The maintenance tickets include unstructured text. The method further involves, for each of the maintenance tickets, performing, by one or more computer processors, a natural language processing of the unstructured text to extract features, and generating, by the computer processor, a topic model for the maintenance tickets, based on the features. The topic model represents each of the maintenance tickets by a collection of topics. The method also involves applying the topic model to obtain maintenance insights for the industrial operation.

20 Claims, 9 Drawing Sheets

METHOD AND SYSTEM FOR INTELLIGENT MAINTENANCE SERVICES USING MACHINE LEARNING

BACKGROUND

Maintenance management is an orderly process to control maintenance resources and activities for the long-term success of an industrial operation. Maintenance management may be performed to preserve and repair assets for a given budget, equipment, and facilities. However, delays and inconsistence of maintenance management increase operational cost and jeopardize the industrial operation's profitability and longevity. Thus, maintenance management may determine a work order of maintenance services to keep assets in high-quality operating condition and reduce disruption in production or service that leads to unexpected downtime. Likewise, the maintenance management may minimize operational cost, protect a plant from liability, and improve environment and personal safety.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for intelligent maintenance services using machine learning, the method comprising: obtaining maintenance tickets associated with an industrial operation, the maintenance tickets comprising unstructured text; for each of the maintenance tickets, performing, by one or more computer processors, a natural language processing of the unstructured text to extract features; generating, by the computer processor, a topic model for the maintenance tickets, based on the features, the topic model representing each of the maintenance tickets by a collection of topics; and applying the topic model to obtain maintenance insights for the industrial operation.

In general, in one aspect, embodiments relate to a system for intelligent maintenance services using machine learning, the system comprising: a natural language processing engine executing on one or more processors and configured to: obtain maintenance tickets associated with an industrial operation, the maintenance tickets comprising unstructured text; for each of the maintenance tickets, perform, by one or more processors, a natural language processing of the unstructured text to extract features; generate, by the processor, a topic model for the maintenance tickets, based on the features, the topic model representing each of the maintenance tickets by a collection of topics; and a corporate dashboard configured to: apply the topic model to obtain maintenance insights for the industrial operation.

In general, in one aspect, embodiments relate to a non-transitory machine-readable medium comprising a plurality of machine-readable instructions executed by one or more processors, the plurality of machine-readable instructions causing the one or more processors to perform operations comprising: obtaining maintenance tickets associated with an industrial operation, the maintenance tickets comprising unstructured text; for each of the maintenance tickets, performing, by one or more computer processors, a natural language processing of the unstructured text to extract features; generating, by the computer processor, a topic model for the maintenance tickets, based on the features, the topic model representing each of the maintenance tickets by a collection of topics; and applying the topic model to obtain maintenance insights for the industrial operation.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
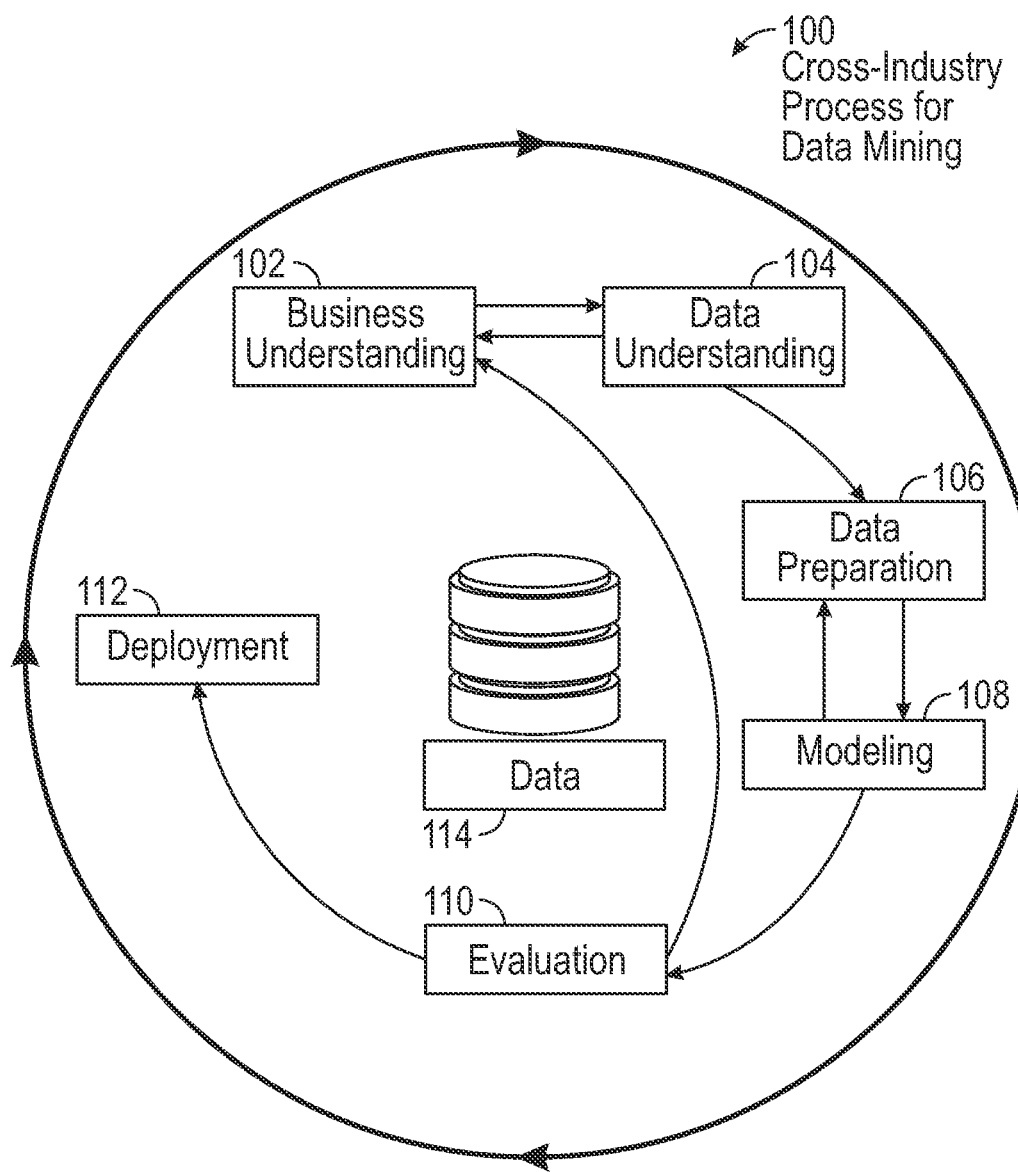
FIG. 1 shows a cross-industry process for data mining in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for an intelligent maintenance management system using one or more advanced analytics tools (e.g., natural language processing) and machine learning algorithms (e.g., Latent Dirichlet Allocation) to determine a maintenance trend, a cost of repair, and a work order of maintenance services for a maintenance scheduling system of interest. In order to improve operational efficiency and plant reliability, the intelligent maintenance management system may identify a list of top maintenance trends and number of occurrences of maintenance requests for one or more crafts (e.g., a maintenance type) by analyzing and classifying unstructured text data obtained from a text description of maintenance tickets. Time-consuming manual analysis of maintenance tickets is avoided. The intelligent maintenance management system may report major findings and associated maintenance services in order to eliminate malfunction recurrence. The intelligent maintenance management system may help optimize operations to maximize revenues and identify frequent maintenance issues with high operation/repair cost so that proactive actions may be taken to prevent them in the future.

Some embodiments use one or more natural language processing (NPL) algorithms and machine learning algorithms (e.g., a Latent Dirichlet Allocation algorithm) to determine one or more clusters of topics based on a Bag of Words model. For example, an intelligent maintenance management system applies a Bag of Words model to express unstructured text data of maintenance tickets using word vectors. As another example, an intelligent maintenance management system may apply topic modeling to determine one or more clusters of topics using a Latent Dirichlet Allocation algorithm and the determined word vectors derived from unstructured text data of maintenance tickets. The determined clusters of topics may be used to generate a maintenance trend and a work order of maintenance services for interactive display for a user via a graphical user interface (e.g., an interactive dashboard) to observe appearances, conflicts, and awareness of possible issues. In some embodiments, the determined maintenance trend and work order of maintenance services may be updated based on real-time issued maintenance tickets and other metadata such as cost of repair and location during actual performance of the work order of maintenance services.

In accordance with embodiments disclosed herein, FIG. 1 shows a Cross Industry Standard Process for Data Mining (CRISP-DM) framework (100) which consists of six different phases: a business understanding phase (102), a data understanding phase (104), a data preparation phase (106), a modeling phase (108), an evaluation phase (110), and a deployment phase (112). These phases are performed sequentially in an iterative process.

The business understanding phase (102) includes functionality to assess a set of data (e.g., customers, clients, target markets). For example, the business understanding phase (102) determines a project objective and criterion from a business perspective, and then formulates this knowledge in a data science problem and a preliminary work order of maintenance services.

In the example of an intelligent maintenance management system, the data understanding phase (104) includes functionality to obtain unstructured text data (114) of maintenance tickets and to pre-processes the obtained unstructured text data for quality related issues. For example, the data understanding phase (104) may collect a list of maintenance tickets that include crucial details associated with maintenance service requests, crafts, location of the units, the cost of each repair, date, and time from a maintenance scheduling system. Unstructured text data of maintenance tickets may include a ticket ID, a problem description raw text, time of the request creation, cost of repair for material and human labor, location information (e.g., area, functional location), and/or craft type. In the data understanding phase (104) the unstructured text data of maintenance tickets may be analyzed for missing or incomplete information. Data, including the unstructured text data of the maintenance tickets, may be obtained from a database. Any type of database such as an SQL or non-SQL database may be used. Alternatively or additionally, the data may be obtained from a user, e.g. a maintenance engineer.

In the example of an intelligent maintenance management system, the data preparation phase (106) includes functionality to analyze text data and prepare input data for building a model. The data preparation phase (106) uses an Extract, Transform, and Load (ETL) software or script to extract text data from multiple locations, transform them into an encoded format, and then load them into a uniform location (e.g., a database). For example, in the data preparation phase (106) cleaned text data may be generated from unstructured text data of maintenance tickets using various pre-processing steps as described below in reference to the flowchart.

In the example of an intelligent maintenance management system, the modeling phase (108) includes functionality to train one or more topic models using a machine learning model to predict various behaviors and a work order of maintenance services based on the cleaned text data of maintenance tickets.

In the modeling phase (108), the cleaned text data of maintenance tickets may be converted into word vectors using a Bag of Words model. Further, the modeling phase (108) trains a model using a Latent Dirichlet Allocation algorithm to represent each of maintenance tickets as a collection of clusters of topics which are associated with a probability that a maintenance ticket belongs to a topic. In particular, the modeling phase (108) evaluates a model based on a maximum coherence value which is a measure of semantic similarity between maintenance tickets in the each of the clusters of a model. When the model is trained and evaluated, the cleaned text data of maintenance may be modified in the data preparation phase (106) to improve the maximum coherence value for the model. The details are discussed below in reference to FIGS. 2 and 3.

In the example of an intelligent maintenance management system, the evaluation phase (110) includes functionality to output the determined clusters of topics and work order of maintenance services for interactive display to a user via a graphical user interface (e.g., a dashboard). For example, an interactive topic clustering chart may be used to show the clusters of topics in which each of the maintenance tickets is grouped. Each cluster of topics denotes a specific context (topic) that those tickets share. It also shows the terms that denote each of the topics along with their weights. Various statistical values may further be determined: 1) cost per topic per location which is a maintenance cost at each location and broken down by topic; 2) frequency of topic per location which is the number of tickets that are submitted from each location and broke down by topic; 3) frequency of tickets submitted per topic for each week of the year which is the number of tickets submitted under that topic for each week. A user may use the statistical values, for example, to identify time-based maintenance trends and to determine whether certain issues tend to be reported more during certain times of the year.

In the example of an intelligent maintenance management system, the deployment phase (112) includes functionality to automatically self-feed and build a database for a historical learning process that clearly enumerates changes to a work order of maintenance services based on newly acquired unstructured text data of maintenance tickets and statistical trends. An intelligent maintenance management system may apply the iterative CRISP-DM framework (100) to build a model by obtaining newly acquired unstructured text data of maintenance tickets. The deployment phase (112) provides more business understanding which also helps to improve the model to achieve better performance of maintenance for the plant.

Figure 2:
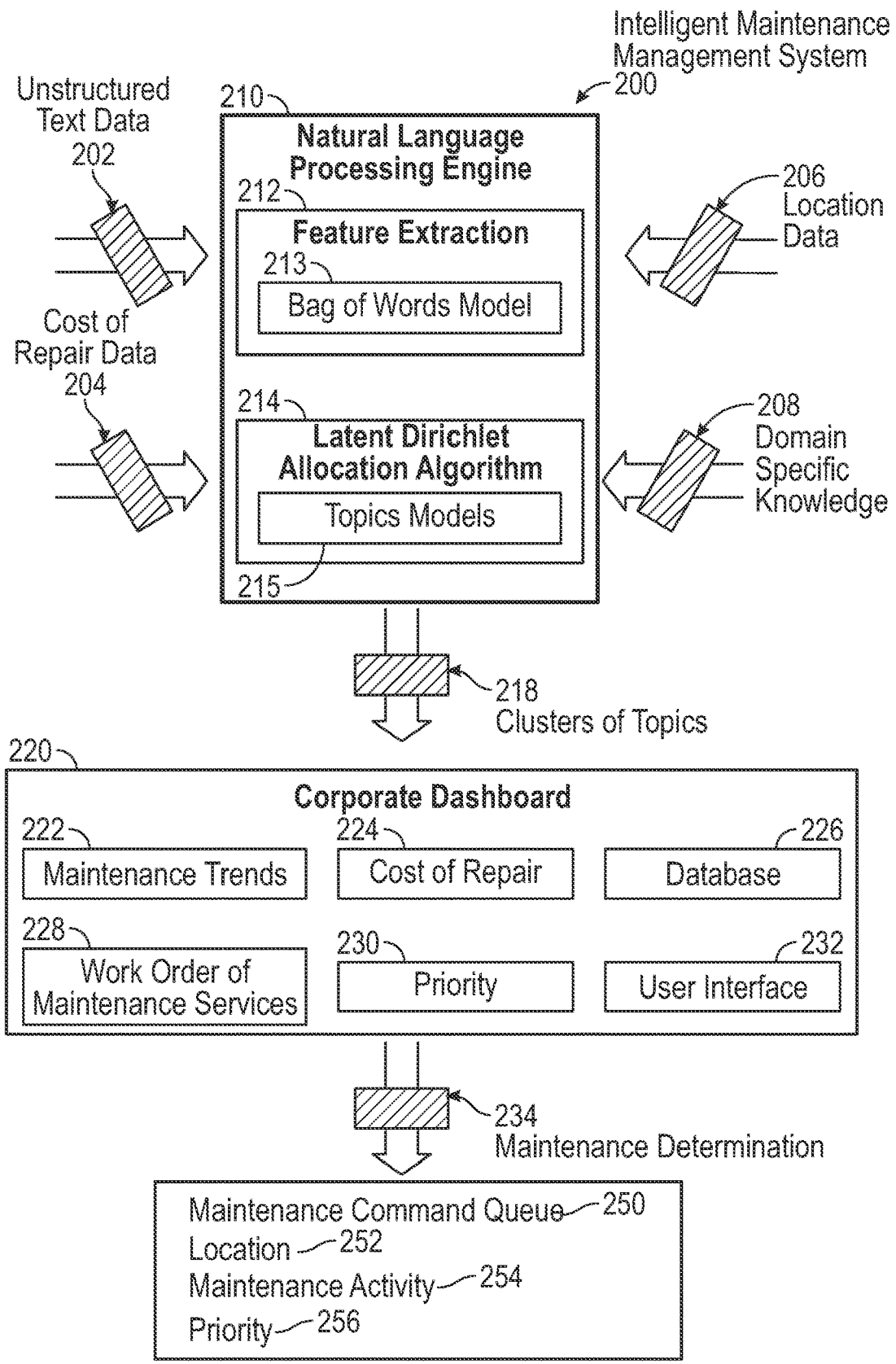
FIG. 2 shows an intelligent maintenance system for an industrial operation in accordance with one or more embodiments.

FIG. 2 shows an intelligent maintenance system (200), in accordance with one or more embodiments of the disclosure. The intelligent maintenance system (200) may be used in conjunction with any industrial or non-industrial operation. For example, the intelligent maintenance system may be used in conjunction with a petrochemical plant or in conjunction with residential facilities. In FIG. 2, a natural language processing engine (210) may process unstructured text data (202), e.g., from maintenance tickets and/or other inputs such as cost of repair data (204), location data (206), and/or domain specific knowledge data (208). The natural language processing engine (210) may further perform a feature extraction (212). In one embodiment, a Bag of Words model (213) is used for the feature extraction (212). as inputs. The Bag of Words model (213) uses word vectors to represent useful information of input data (e.g., unstructured text data (202)). For example, a Bag of Words model determines multi-dimensional continuous floating point numbers to represent two maintenance tickets (e.g., ticket ID of "1" for repairing a computer system and ticket ID of "2" for repairing a drilling bit) where semantically similar words are mapped to proximate points in geometric space.

In one or more embodiments, the natural language processing engine (210) also generates a model (e.g., topic model (215)) using a Latent Dirichlet Allocation algorithm (214) to determine one or more clusters of topics (e.g., clusters of topics data (218)) based on the extracted features of maintenance tickets. The model is trained to represent each of the tickets as a collection of topics, and each topic is associated with a probability that the maintenance ticket belongs to that topic. In particular, the clusters of topics data (218) may be stored in a database (226) of a corporate dashboard (220). Likewise, the clusters of topics data (218) may be displayed in the corporate dashboard (220). A graphical user interface (232) may enable the user to interact with content of the corporate dashboard (220), e.g., to observe and adjust appearances, conflicts, and awareness of possible issues with the clusters of topics data. Different statistical trends (e.g., maintenance trends (222)) and associated cost of repair (e.g., cost of repair (224)) and priority (e.g., priority (230)) may be calculated to determine a work order of maintenance services (e.g., work order of maintenance services (228)). The corporate dashboard (220) may provide an interactive chart and/or a plot for clustering maintenance tickets and assessing statistical maintenance trends (222) associated with cost of repair (224) and priority (230). Examples are described below in reference to the figures. The statistical maintenance trends (222) may include information related to the frequency of topics per location which corresponds to the number of tickets that are submitted from each location and broken down by topic. Further, the statistical maintenance trends (222) may include information related to frequency of tickets submitted per topic for each week of the year which is the number of tickets submitted under that topic for each week. In addition, the cost of repair (224) may include information related to cost per topic per location which corresponds to a maintenance cost at each location and broken down by topic.

A maintenance determination (234) may be made by the user via a graphical user interface (232) to generate a maintenance command queue (250) to take actions of maintenance services based on the determine work order of maintenance services (228). The maintenance command queue (250) also includes information related to location (252), maintenance activity (254), and priority (256) for maintenance employees to identify time-based maintenance trends and whether certain issues tend to be reported more during certain times of the year.

While FIGS. 1 and 2 shows various configurations of components, other configurations may be used without departing from the scope of the disclosure. For example, various components in FIGS. 1 and 2 may be combined to create a single component. As another example, the functionality performed by a single component may be performed by two or more components.

Figure 3:
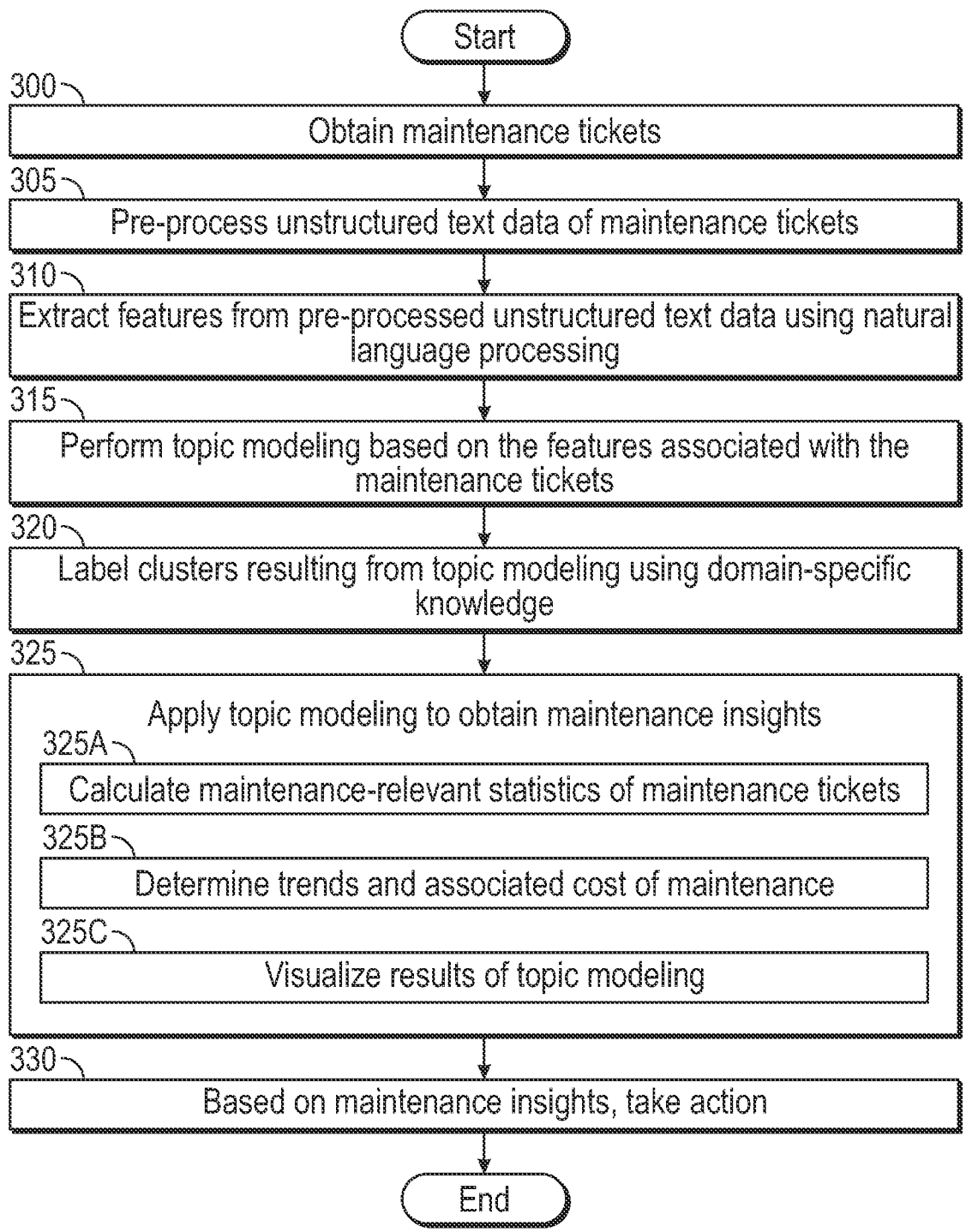
FIG. 3 shows a flowchart in accordance with one or more embodiments.

FIG. 3 shows a flowchart in accordance with one or more embodiments. FIG. 3 describes a method for identifying the trends of most frequent maintenance issues for an industrial or non-industrial operation. Given a list of maintenance tickets (requests), crafts, location of the units, the cost of each repair, date and time, the proposed method may find the semantic similarity between text data of the maintenance requests, cluster them, calculate the statistics and associate the cost over time (trend) and locations (e.g., different facilities).

One or more blocks in FIG. 3 may be performed by one or more components of the intelligent maintenance management system (200) shown in FIG. 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, maintenance tickets associated with an industrial or non-industrial operation are obtained. The maintenance tickets may be obtained from a database or from any other source. Each maintenance ticket may include a problem description in the format of raw text. Each maintenance ticket may be accompanied by additional information such as a ticket ID, a time of the request creation, a cost of repair (material plus manhours), location information (area, functional location), a craft type, etc.

In Block 305, the obtained unstructured text data of the maintenance tickets are pre-processed in accordance with one or more embodiments. One or more of the following may be performed. Non-alphabetical characters, such as periods and commas may be removed. The entire corpus may be converted to lower case. Extra spaces may be removed. Sentences may be tokenized to create a list of tokens (words) created from each of the sentences. Stop words (reoccurring words that do not contribute to the meaning of the sentences, such as 'the' and 'are') may be removed. A known list of stop words for each maintenance type may be extended to include common words that are specific to maintenance (e.g. 'fix', 'install', 'repair'). Bigrams (words that usually occur together, and represent one item, e.g. washing machine) may be created. By creating bigrams, the words "washing" and "machine" are grouped together, which ensures that these are treated by the algorithm as one item. Stemming and lemmatization may be performed to reduce words into their root form. Stemming may be algorithm-based and may remove parts of the word that it recognizes as tense additives, which can result in incomplete words (e.g. 'changing' becomes 'chang' instead of 'change'). In contrast, lemmatization may use a look-up table of words, and as a result identifies the correct words. Lemmatization may be used first, followed by stemming Other pre-processing operations may be performed, without departing from the disclosure. For example, maintenance tickets may be categorized according to a craft such as electrical, carpentry, appliances, etc. This may allow the execution of the subsequently described steps by craft, which may result in superior accuracy.

In Block 310, natural language processing is performed to extract one or more features from the unstructured text data associated with the maintenance tickets. A Bag of Words model may be used to generate the features from the unstructured text data. After the execution of Block 310, each of the maintenance tickets may be represented by features, e.g., in vector format, as previously described.

In Block 315, a topic modeling is performed to generate a topic model for the maintenance tickets, based on the features. In one or more embodiments, the topic modeling uses a Latent Dirichlet Allocation (LDA) algorithm. Other unsupervised classification algorithms may be used, without departing from the disclosure. The LDA algorithm may operate on the features to represent each of the maintenance tickets as a collection of topics, each associated with a probability that the maintenance ticket belongs to that topic. Multiple topic modelings may be performed. If multiple topic modelings are performed, the resulting topic model with the highest coherence value, which is a measure of semantic similarity between the maintenance tickets in each of the clusters generated by the topic modeling, may be selected for further use. Different topic models may be a result of different data used for the topic modeling. For example, the craft "appliances" would have topics such as washing machine, fridge, AC, whereas the craft "carpentry" would have topics such as door, furniture, etc.

In Block 320, the clusters resulting from the topic modeling are labeled using domain-specific knowledge. For example, a maintenance engineer may label the topics upon reviewing the topics. The maintenance engineer may have domain-specific knowledge, such as expertise in the craft "appliances" and may thus be a trustworthy resource for labeling.

In Block 325, the topic modeling is applied, to obtain maintenance insights. Maintenance insights may be obtained in various manners as described in Blocks 325A, 325B, and 325C.

In Block 325A, maintenance-relevant statistics are calculated for the maintenance tickets, based on the topic modeling. For example, the maintenance cost per cluster of topics may be determined, to obtain insights on maintenance cost allocation. A similar cost calculation may be performed per location. Further, a frequency of topics per location may be calculated to identify the primary maintenance issues associated with the location.

In Block 325 B, trends and associated costs of maintenance are determined. To determine trends, statistics, e.g., the statistics described in Block 325A, may be assessed over time. Thus, insights on maintenance cost over time may be obtained. For example, it may determined whether the maintenance cost has a seasonality component.

In Block 325C, the results of the topic modeling may be visualized in a user interface. For example, a topic clustering chart may show the clusters of topics in which each of the maintenance tickets is grouped. Each cluster denotes a specific context (topic) that the maintenance tickets in the cluster share. Additionally, the terms that denote each of the topics along with their weights may be shown. Further, a cost per topic per location may be visualized, based on the known location associated with each of the maintenance ticket. A maintenance cost at each location may thus be shown, and the maintenance cost may be broken down by topic. Also, the frequency of topics per location may be visualized to show the number of tickets that are submitted from each location. The visualization may be broken down by topic. Many other visualizations may be provided to the user, without departing from the disclosure. Examples of various visualizations are provided below.

In Block 330, based on the maintenance insights, a plant manager or other user may take action to increase productivity and/or to reduce maintenance cost. For example, machinery that causes excessive maintenance costs may be replaced. Subsequent execution of the method as described based on more recently submitted maintenance tickets may allow the plant manager to monitor whether the actions had the desired effect.

Figure 4A:
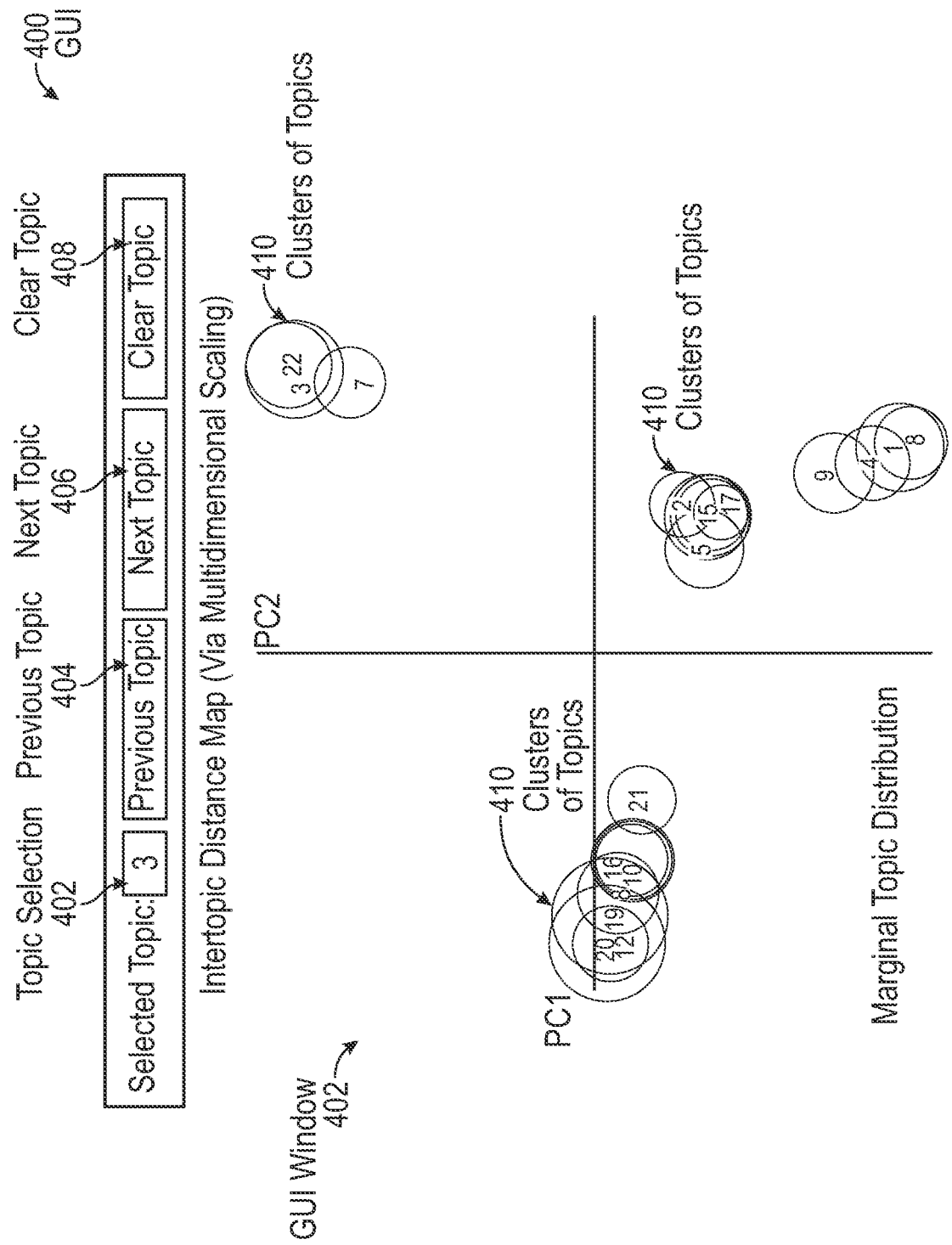
FIGS. 4A and 4B show examples in accordance with one or more embodiments.

FIG. 4A shows an example of a GUI (400) that exhibits an inter-topic distance map for one or more clusters of topics for a topic (e.g., topic 3, selected in the example of FIG. 4A). The inter-topic distance map may be generated based on the output of Operation 315, as previously described. The GUI (400) is part of a software application that interacts with a user via a graphical display. The GUI (400) receives input from the user through different modes of access, such as a mouse and pointer combination, or through a keyboard. A visual output of a GUI (400) is typically displayed on a display device, such as a computer monitor screen, and includes widgets that allow the user to interact with the GUI (400). Examples of widgets include windows, captions, buttons, labels, menu bars, toolbars, dialog boxes, menus, icons, etc. An example of a GUI (400) visual output is a window (401) as shown in FIG. 4A. In this example, there are Topic Selection dialog box (402), a Previous Topic button (404), a Next Topic button (406), a Clear Topic button (408), as indicated by appropriate labels.

Figure 4B:
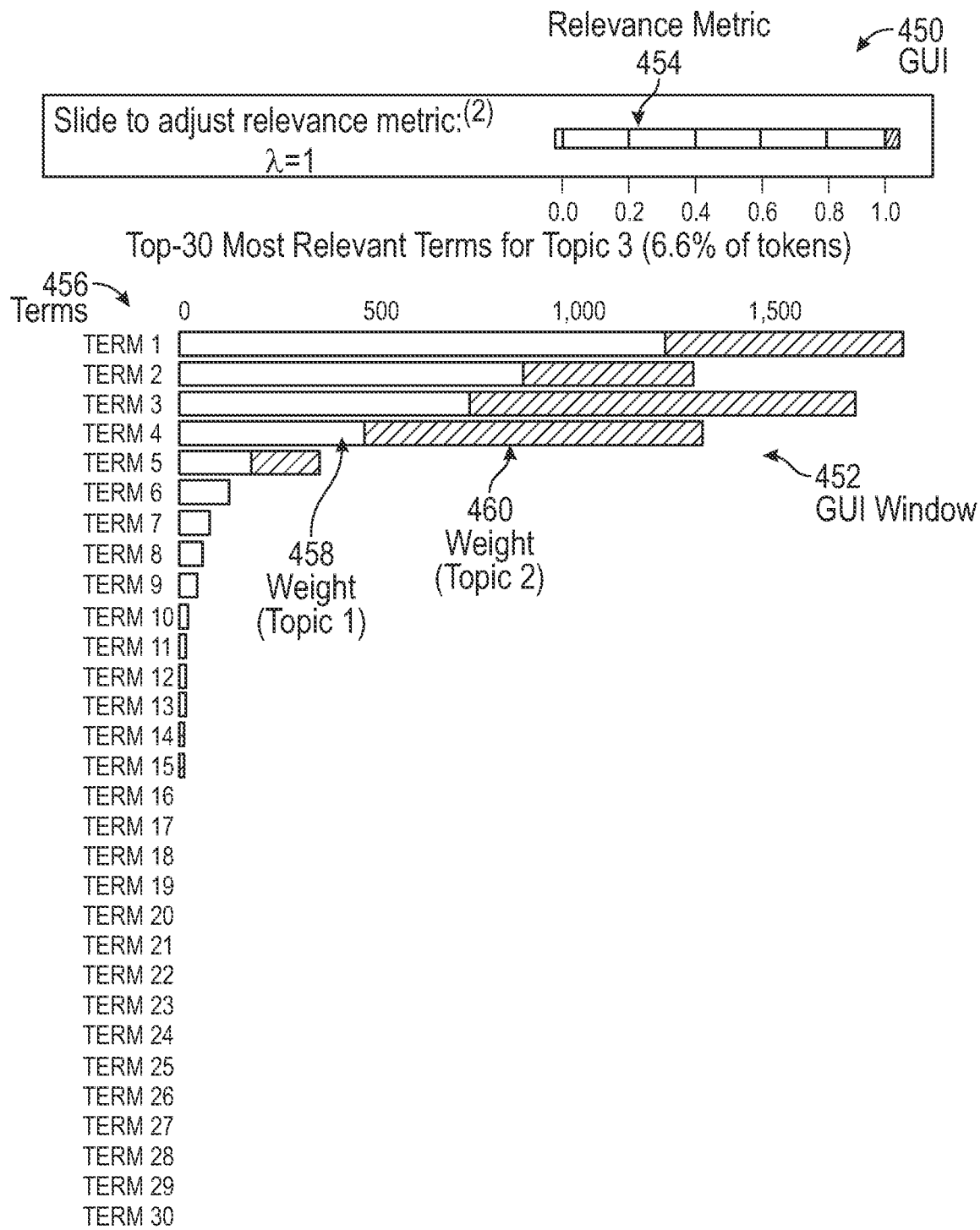

FIG. 4B shows a GUI (450) example of the top 30 most relevant terms for a selected topic (e.g., topic 3 chosen in the Topic Selection dialog box (402)). Examples of most relevant terms may be terms such as "smoke" "detector", "beep", "alarm", "battery", "activ", etc. The most relevant terms may be determined, e.g., based on one of the statistical analyses performed in Operation 325A, as previously described. The example includes a Relevance Metric dialog box (454). The relevance metric may determine how the relevance of the terms are evaluated. For example, an adjustment of the relevance metric may change the ranking between considering a topic-specific probability of a term and another method, e.g., based on a ratio of the term's probability within a topic to its marginal probability across the corpus. The user may adjust the relevance metric as desired.

Figure 5:
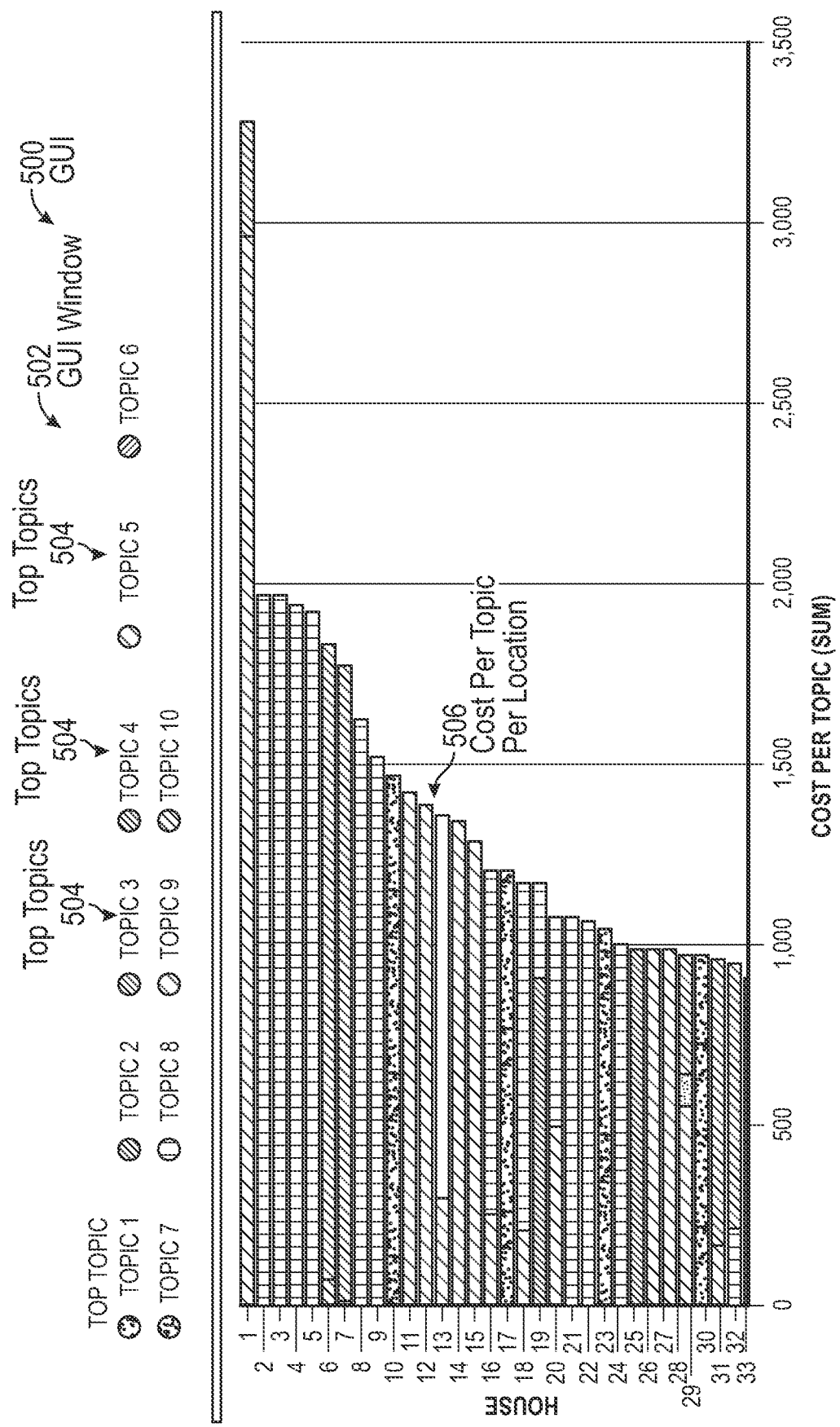
FIG. 5 shows an example in accordance with one or more embodiments.

FIG. 5 shows a GUI (500) example of cost per topic per location (506) for one or more top topics (504). Examples of top topics are "appliance supply", "electrical outlet", "electrical supply", "exhaust fan", "fire alarm", "garbage disposal", etc. An example of a GUI (500) visual output is a window (502) as shown in FIG. 5. In this example, the user chooses 10 top topics from all the available topics. In the example, the cost is displayed on the x-axis, whereas the different locations are displayed on the y-axis of the chart displayed in the GUI window (502).

Figure 6:
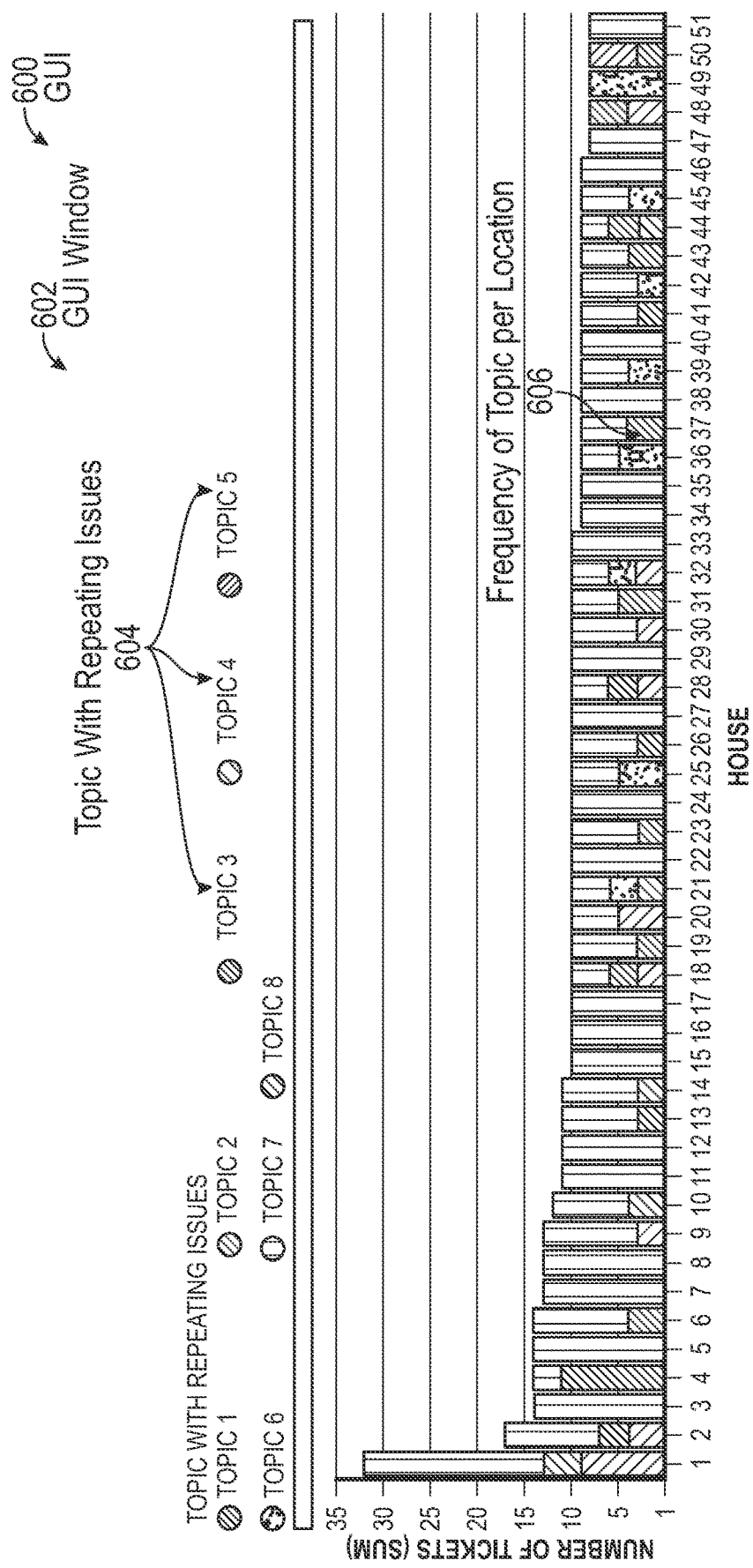
FIG. 6 shows an example in accordance with one or more embodiments.

FIG. 6 shows a GUI (600) example of frequency of topic per location (606) for one or more top topics with repeating issues (604). Examples of topics with repeating issues are "electrical outlet", "electrical supply", "exhaust fan", "fire alarm", "garbage disposal", "lighting", etc. An example of a GUI (600) visual output is a window (602) as shown in FIG. 6. In this example, the user chooses 8 top topics with repeating issues. When a user chooses the 8 top topics with repeating issues, a message is sent from the mouse to the GUI (600) to start to display the frequency of topic per location (606) for multiple locations (e.g., houses). In the example, the different locations are displayed on the x-axis, whereas the number of tickets is displayed on the y-axis of the chart displayed in the GUI window (602).

Figure 7:
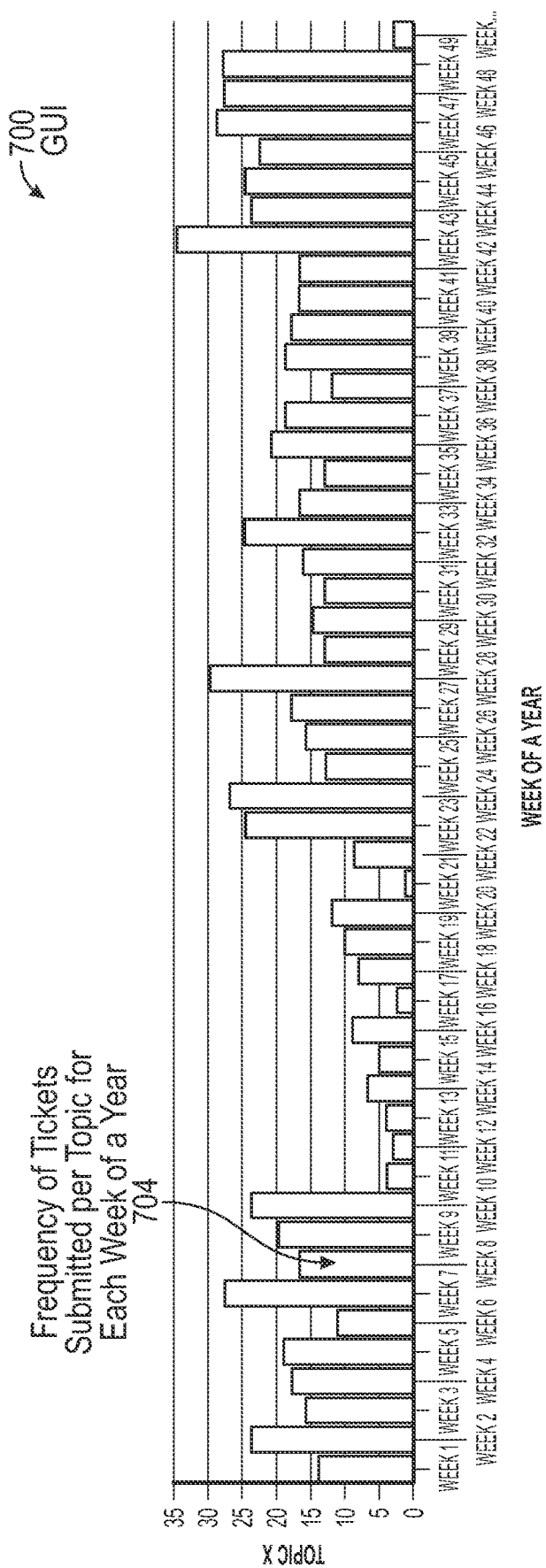
FIG. 7 shows an example in accordance with one or more embodiments.

FIG. 7 shows a GUI (700) example of the frequency of tickets submitted per topic for each week of a year (704). In the example, the user chooses a particular topic, e.g., the topic "Garage and Bell". As a result, the number of maintenance tickets associated with the topic "Garage and Bell" are visualized over time. The time interval and the topic may be user selectable.

Figure 8:
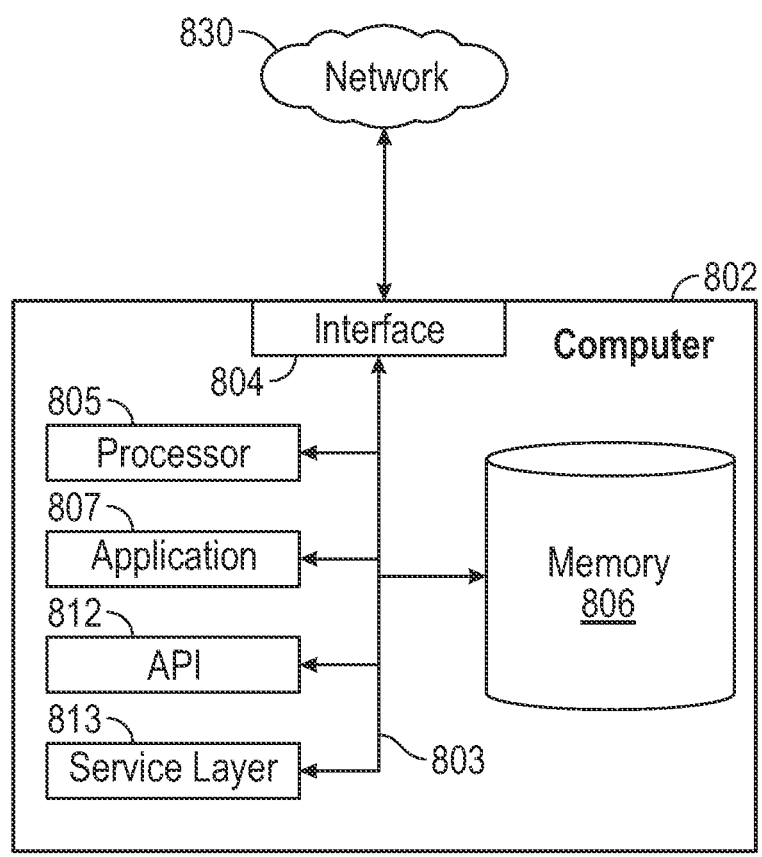
FIG. 8 shows a computer system in accordance with one or more embodiments.

Embodiments may be implemented on a computer system. FIG. 8 is a block diagram of a computer system (802) used to provide computational functionalities associated with described algorithms, methods, functions, processes, flows, and procedures as described in the instant disclosure, according to an implementation. The illustrated computer (802) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802)) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or other suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804 includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), each computer (802) communicating over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

In some embodiments, the computer (802) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
    obtaining a plurality of maintenance tickets associated with an industrial operation, the plurality of maintenance tickets comprising unstructured text;
    performing, by a computer processor, a natural language processing of the unstructured text to extract a plurality of features and based on the plurality of maintenance tickets;
    generating, by the computer processor, a topic model for the plurality of maintenance tickets based on the plurality of extracted features, wherein the topic model is a machine learning model that predicts a work order of maintenance services using word vectors based on the plurality of extracted features; and
    providing, by the computer processor and using the topic model and a graphical user interface (GUI) on a display device, an interactive chart that clusters the plurality of maintenance tickets into at least one cluster of topics;
    obtaining, by the computer processor, a user input within the GUI for a topic selection among a plurality of topics;
    generating, by the computer processor and based on the user input within the GUI, a GUI window that adjusts the interactive chart based on the topic selection and using the topic model, wherein the GUI window identifies at least one maintenance trend based on the topic selection;
    determining, by the computer processor, a maintenance command queue for scheduling an order of a plurality of maintenance operations with the industrial operation based on the at least one maintenance trend; and
    performing the plurality of maintenance operations with the industrial operation based on the maintenance command queue.

2. The method of claim 1, wherein the extracting of the plurality of features is performed using a Bag of Words model.

3. The method of claim 1, wherein generating the topic model is performed using a Latent Dirichlet Allocation.

4. The method of claim 1, further comprising:
    calculating maintenance-relevant statistics of the plurality of maintenance tickets, using the topic model.

5. The method of claim 4, wherein the maintenance-relevant statistics comprise one selected from a group consisting of:
    maintenance cost for at least one of the plurality of topics,
    maintenance cost per location,
    frequency of the plurality of topics per location,
    maintenance cost per,
    trends of cost over time, and
    seasonality of cost.

6. The method of claim 1 wherein applying the topic model to obtain maintenance insights for the industrial operation comprises:
    visualizing, in a graphical user interface, the maintenance insights, using one selected from a group consisting of:
    an inter-topic distance map,
    a display of most relevant terms per topic,
    a display of a cost per topic per location
    a display of a frequency of one of the plurality of topics per location, and
    a frequency of the plurality of maintenance tickets over time.

7. The method of claim 1, further comprising:
    labeling at least one topic of the plurality of topics using domain-specific knowledge associated with the industrial operation.

8. The method of claim 1, further comprising:
    pre-processing the unstructured text, prior to performing the natural language processing, the pre-processing comprising at least one selected from a group consisting of:
    removal of non-alphabetical characters,
    conversion to lower case,
    removal of extra spaces,
    tokenization of sentences
    removal of stop words,
    generation of bigrams,
    stemming, and
    lemmatization.

9. A system, comprising:
    a natural language processing engine executing on one or more processors and configured to:

obtain a plurality of maintenance tickets associated with an industrial operation, the plurality of maintenance tickets comprising unstructured text;
perform, by one or more processors, a natural language processing of the unstructured text to extract a plurality of features and based on the plurality of maintenance tickets;
generate, by the one or more processors, a topic model for the plurality of maintenance tickets based on the plurality of extracted features, wherein the topic model is a machine learning model that predicts a work order of maintenance services using word vectors based on the plurality of extracted features; and
a corporate dashboard comprising a computer processor and a display device, the corporate dashboard being configured to:
provide, using the topic model and a graphical user interface (GUI) on the display device, an interactive chart that clusters the plurality of maintenance tickets into at least one cluster of topics;
obtain a user input within the GUI for a topic selection among a plurality of topics;
generate, based on the user input within the GUI, a GUI window that adjusts the interactive chart based on the topic selection and using the topic model, wherein the GUI window identifies at least one maintenance trend based on the topic selection;
determine a maintenance command queue for scheduling an order of a plurality of maintenance operations with the industrial operation based on the at least one maintenance trend; and
perform the plurality of maintenance operations with the industrial operation based on the maintenance command queue.

10. The system of claim 9, wherein the plurality of features are extracted using a Bag of Words model.

11. The system of claim 9, wherein the topic model is generated using a Latent Dirichlet Allocation.

12. The system of claim 9, wherein the corporate dashboard is further configured to:
calculate maintenance-relevant statistics of the plurality of maintenance tickets, using the topic model.

13. The system of claim 12, wherein the maintenance-relevant statistics comprise one selected from a group consisting of:
maintenance cost for at least one of the plurality of topics,
maintenance cost per location,
frequency of the plurality of topics per location,
maintenance cost per,
trends of cost over time, and
seasonality of cost.

14. The system of claim 9,
wherein the corporate dashboard is further configured to:
visualize, in the graphical user interface, a plurality of maintenance insights, using one selected from a group consisting of:
an inter-topic distance map,
a display of most relevant terms per topic,
a display of a cost per topic per location
a display of a frequency of one of the plurality of topics per location, and
a frequency of the plurality of maintenance tickets over time.

15. The system of claim 9, wherein the natural language processing engine is further configured to:

label at least one topic of the plurality of topics using domain-specific knowledge associated with the industrial operation.

16. The system of claim 9, wherein the natural language processing engine is further configured to:
pre-process the unstructured text, prior to performing the natural language processing, the pre-processing comprising at least one selected from a group consisting of removal of non-alphabetical characters,
conversion to lower case,
removal of extra spaces,
tokenization of sentences
removal of stop words,
generation of bigrams,
stemming, and
lemmatization.

17. A non-transitory computer readable medium storing instructions executable by a computer processor, the instructions being configured to perform a method comprising:
obtaining a plurality of maintenance tickets associated with an industrial operation, the plurality of maintenance tickets comprising unstructured text;
performing a natural language processing of the unstructured text to extract a plurality of features and based on the plurality of maintenance tickets;
generating a topic model for the plurality of maintenance tickets based on the plurality of extracted features, wherein the topic model is a machine learning model that predicts a work order of maintenance services using word vectors based on the plurality of extracted features; and
providing, using the topic model and a graphical user interface (GUI) on a display device, an interactive chart that clusters the plurality of maintenance tickets into at least one cluster of topics;
obtaining a user input within the GUI for a topic selection among a plurality of topics;
generating, based on the user input within the GUI, a GUI window that adjusts the interactive chart based on the topic selection and using the topic model, wherein the GUI window identifies at least one maintenance trend based on the topic selection;
determining a maintenance command queue for scheduling an order of a plurality of maintenance operations with the industrial operation based on the at least one maintenance trend; and
performing the plurality of maintenance operations with the industrial operation based on the maintenance command queue.

18. The non-transitory computer readable medium of claim 17, wherein the method further comprises:
calculating maintenance-relevant statistics of the plurality of maintenance tickets, using the topic model.

19. The non-transitory computer readable medium of claim 18, wherein the maintenance-relevant statistics comprise one selected from a group consisting of:
maintenance cost for at least one of the plurality of topics,
maintenance cost per location,
frequency of the plurality of topics per location,
maintenance cost per,
trends of cost over time, and
seasonality of cost.

20. The non-transitory computer readable medium of claim 17, wherein the method further comprises:
visualizing, in the graphical user interface, a plurality of maintenance insights, using one selected from a group consisting of:

an inter-topic distance map,
a display of most relevant terms per topic,
a display of a cost per topic per location
a display of a frequency of one of the plurality of topics per location, and
a frequency of the plurality of maintenance tickets over time.

* * * * *